United States Patent [19]
Evans et al.

[11] 3,818,159
[45] June 18, 1974

[54] MATERIAL LEVEL INDICATOR SENSOR
[75] Inventors: Arthur J. Evans, Northville; Chester J. Randolph, Royal Oak, both of Mich.
[73] Assignee: Whitlock, Inc., Farmington, Mich.
[22] Filed: July 19, 1973
[21] Appl. No.: 380,608

[52] U.S. Cl. ............................ 200/61.12, 340/246
[51] Int. Cl. .......................................... H01h 35/00
[58] Field of Search .......... 200/61.2, 61.21, 81.9 R; 340/246

[56] References Cited
UNITED STATES PATENTS

| | | | |
|---|---|---|---|
| 2,698,362 | 12/1954 | Bozich | 200/61.21 |
| 2,851,553 | 9/1958 | Grostick | 200/61.21 |
| 2,909,766 | 10/1959 | Bozich | 200/61.21 X |
| 2,961,842 | 11/1960 | Wright | 340/246 X |
| 3,192,858 | 7/1965 | Crumb, Jr. | 200/81.9 R X |
| 3,510,861 | 5/1970 | McIver et al. | 200/61.21 X |

*Primary Examiner*—James R. Scott
*Attorney, Agent, or Firm*—Kinzer, Plyor, Dorn & McEachran

[57] ABSTRACT

A level sensing apparatus of the kind comprising a sensing switch actuated by a rotating paddle, with a cam drive connection between the drive motor and the sensing paddle which protects the drive motor from stalling or jamming in either normal or abnormal operation of the level sensing apparatus; the cam drive connection allows continuing unobstructed rotation of the drive motor shaft, when the sensing paddle is blocked, in the event of a failure of the sensing switch.

6 Claims, 6 Drawing Figures

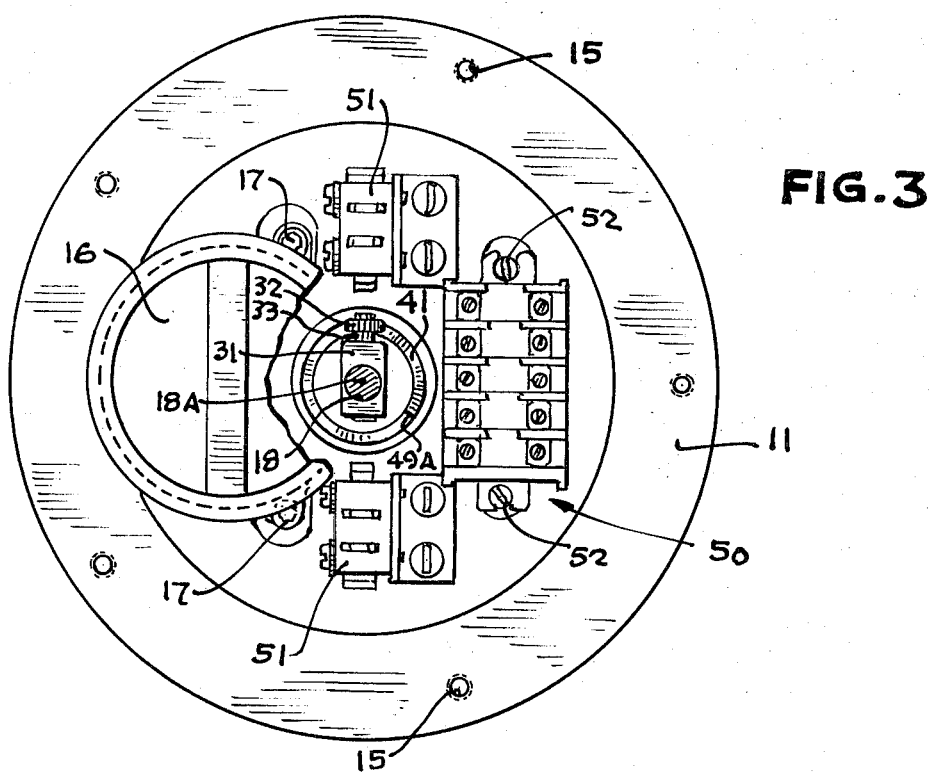
FIG.3
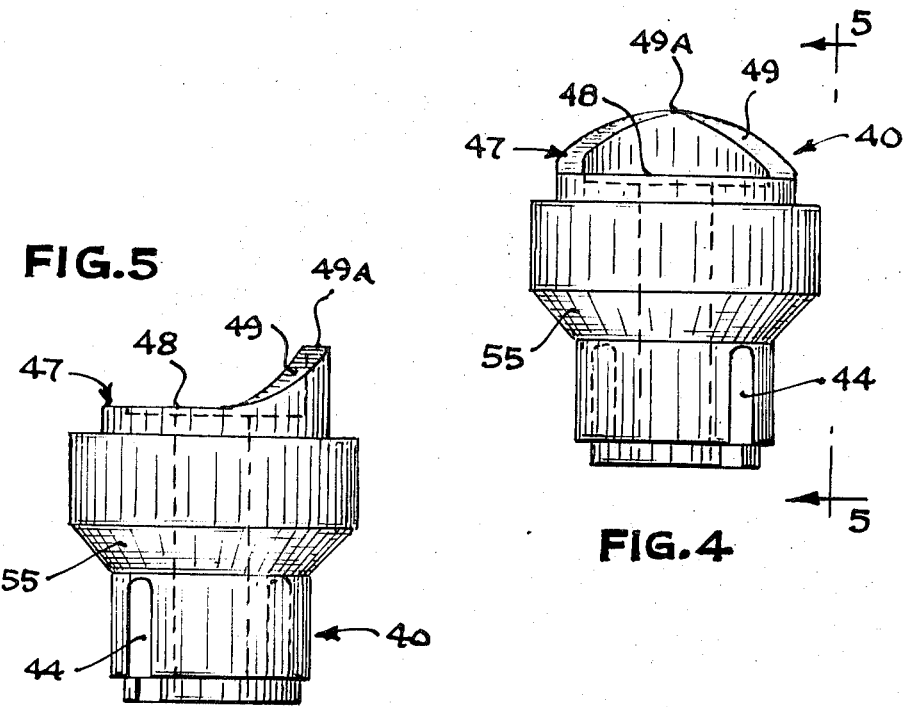
FIG.5
FIG.4

MATERIAL LEVEL INDICATOR SENSOR

BACKGROUND OF THE INVENTION

Various devices have been used to measure the level of the material in a container. One common method for controlling the level of material being pumped into a container has been to use a motor driven rotating paddle sensor which rotates until the material reaches a given level, and blocks the paddle sensor from rotating. The blocking of the paddle is sensed and actuates a means to shut off the pumping of material into the container. When the paddle is blocked, the sensing means may also actuate a switch means to stop the motor which is driving the paddle.

In U.S. Pat. Nos. 2,698,362 and 2,909,766, bin level indicators are shown which cut off the energy supply to the level indicator motor when a sensing paddle is blocked. In each of these devices, the switching apparatus consists of a helical spring interconnecting a motor shaft with a paddle shaft. When the paddle is blocked, the enlarged central convolutions of this spring are deflected outwardly to engage an adjacent switching device that turns off the motor. If the switch fails, however, the motor remains energized even though the paddle is blocked, which can produce substantial damage to the motor.

In U.S. Pat. No. 3,510,861, which describes a level sensing device, a switch is actuated by an axial cam movement which operates to shut off the motor of the level sensor. Again, if the switch fails, there can be substantial damage to the motor. Moreover, various commercial devices incorporate a slip clutch utilizing the slipping of the clutch to initiate rotation of a member which operates the switch. However, again, if the switch fails, substantial damage to the slip clutch or the motor may still occur.

Other commercial arrangements utilize a motor that is directly connected to the sensing paddle, with the motor being maintained energized even when the paddle is blocked. This is a practical working arrangement in many instances, but requires a relatively expensive motor that can withstand substantial periods of stalled operation, and hence is undesirable for many applications.

SUMMARY OF THE INVENTION

A principal object of the present invention is to provide a new and improved level sensing apparatus of the rotating paddle type which protects against energized stalling of the paddle drive motor, even if the means which de-energizes the drive motor upon blocking of the paddle sensor fails.

A particular object of the invention is to provide a new and improved fail-safe drive connection for the paddle of a level sensor which is simple and inexpensive in construction and highly reliable in operation.

In accordance with the invention, a level sensor for sensing accumulation of material is provided which includes a drive member, driving means for driving the drive member rotatingly on a main axis, a driven member rotatable about the main axis, aligned with and engageable with the drive member, a sensing paddle connected to the driven member for rotation therewith, a first one of the drive and driven members including a cam surface with a dwell portion and a lobe portion, a second one of the drive and driven members including a roller which is aligned so as to roll on the cam surface of the first member, where at least one of the drive and driven members is movable away from the other member, biasing means urging the drive and driven members into engagement with each other so that when the sensing paddle is unblocked and free to rotate, the roller will roll against the lobe portion of the cam surface and cause the sensing paddle to rotate, and so that when the sensing paddle is blocked by accumulated material, the roller will ride onto the lobe portion of the cam surface and cause the drive and driven members to move away from each other, and sensing switch means actuated by at least one of the movable members which is actuated from one sensing condition to another whenever the roller rides onto the lobe of the cam surface.

BRIEF DESCRIPTION OF THE DRAWINGS

FIG. 3 is a plan view of the apparatus of FIG. 1 and FIG. 2 taken approximately along line 3—3 of FIG. 2;

FIG. 4 is a side view of one embodiment of a cam member used in the present invention;

FIG. 5 is a view of the cam member taken along line 5—5 in FIG. 4; and

DETAILED DESCRIPTION OF THE INVENTION

Figure 1:
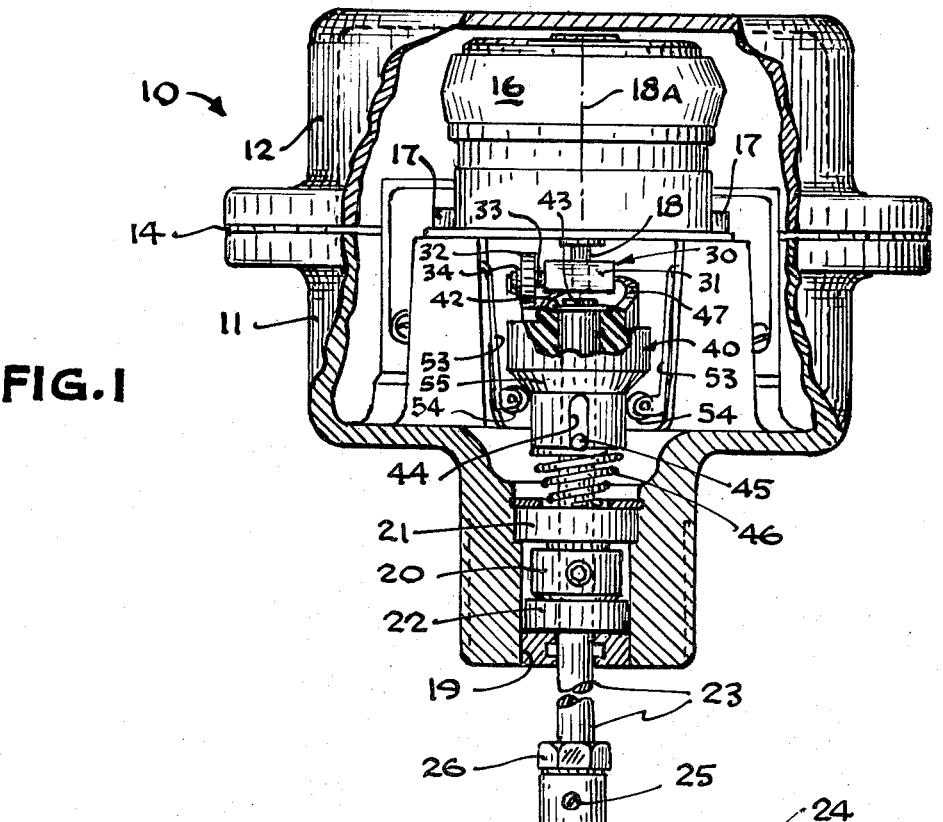
FIG. 1 is a partial sectional side view of one embodiment of the present invention.
Figure 2:
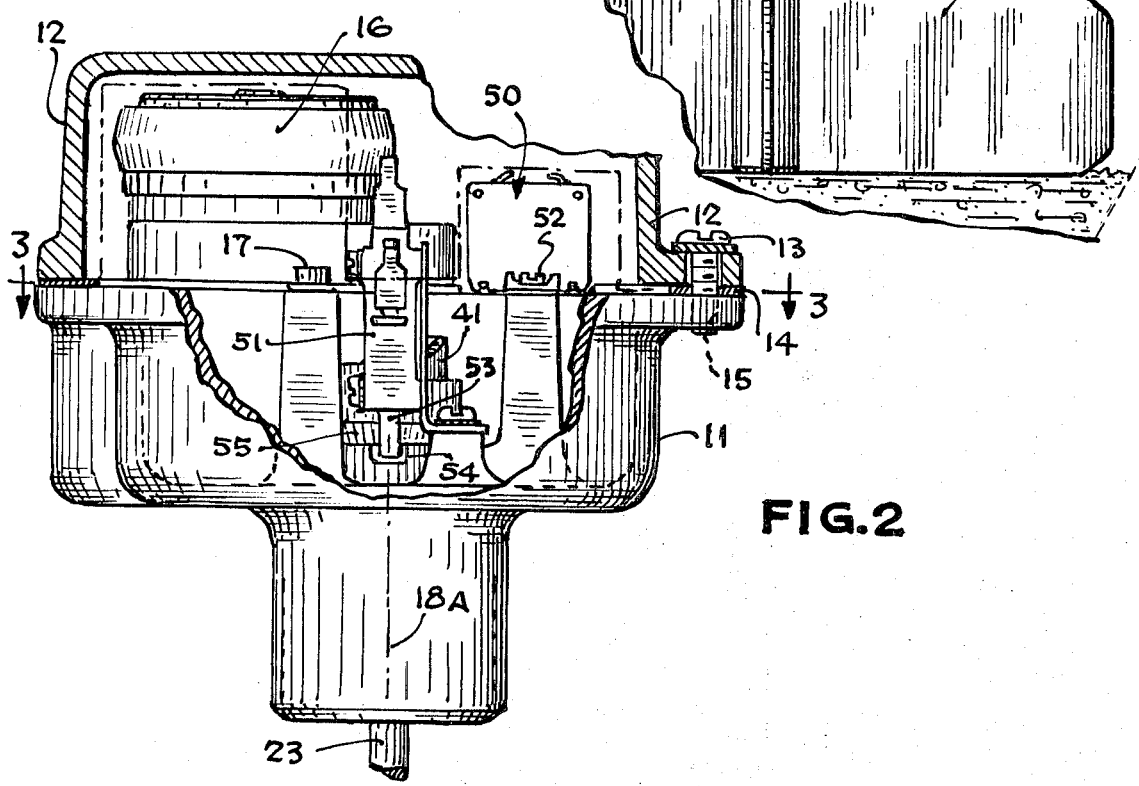
FIG. 2 is a partial sectional front view of the apparatus of FIG. 1.

FIGS. 1, 2 and 3 show one embodiment of a level sensing apparatus 10 of the present invention. A housing 11 and a housing cover 12 form a protective closure for the interior parts of the level sensing apparatus 10. The housing members 11 and 12 can be connected together by conventional means such as the bolts 13 and a gasket 14. The bolts attach the housing members together in complementary holes 15 in both housing 11 and housing cover 12. A motor 16 is affixed firmly to housing 11 by two retaining nuts 17. Motor 16, as illustrated, is a gear motor of conventional construction with a speed reducing gear assembly incorporated in the motor. The output shaft 18 of motor 16 extends downwardly from one side of motor 16 along a main axis shown by lines 18A in FIGS. 1 and 2.

A conventional thrust bearing assembly comprising elements 20, 21 and 22 is mounted in an opening 19 in the lower portion of housing 11 (FIG. 1). A paddle sensor shaft 23 is mounted in the thrust bearing, in axial alignment with the main axis 18A, being supported by thrust bearing element 20. The upper end of paddle sensor shaft 23 extends close to the lower end of motor output shaft 18 but is not positively connected to shaft 18. On the opposite end of the paddle sensor shaft 23, a sensor paddle 24 is mounted. This can be done by conventional means such as a set screw 25 and a pressure retaining nut 26.

As best shown in FIG. 1, a roller assembly 30 is attached to the lower end of shaft 18. Assembly 30 is a drive member which comprises a drive arm 31 attached to the shaft 18 by suitable means such as a set screw (not shown). At the outer end of drive arm 31, a roller 32 is rotatably mounted on the drive arm by means of a roller shaft 33, formed integrally with arm 31, and a retainer 34. In this embodiment the roller rotates about the axis of a shaft 33, which is perpendicular to the main axis 18A. Thus, as the output shaft 18 of motor 16 turns the roller 32 rotates in a circular orbital pattern around the main axis 18A, with the roller at a constant radius from the main axis.

A cam member 40 is mounted on the upper end of paddle sensor shaft 23. Cam 40 is slidably mounted on shaft 23, with upward movement of the cam being limited by a retainer 42 held in place by a retainer bolt 43. Cam 40 slides only in a direction parallel to the main axis 18A and does not rotate around the paddle sensor shaft 23. Rotation of cam 40 relative to shaft 23 is prevented by a pin 45 extending radially outwardly from shaft 23 and engaging in a slot 44 in cam 40. When cam 40 is at its uppermost position, as shown in FIG. 1, the top of cam 40 is in contact with retainer 42. Slot 44 is long enough to allow cam 40 to slide downwardly along shaft 23, parallel to the main axis 18A, to a position substantially displaced from retainer 42. A biasing means urges cam 40 toward engagement with retainer 42. This biasing means is shown as a coil spring 46, which applied force against the bottom surface of cam 40 and a fixed surface such as bearing element 21. On top of cam 40 is a cam surface 47. This surface may be better seen in FIGS. 4 and 5. Cam surface 47 comprises a dwell portion 48 and a lobe portion 49 formed by two gradually sloped segments joining at a sharp peak or tip 49A. The sharp peak is employed to preclude roller 32 coming to rest on tip 49A.

Also mounted within housing 11 is a terminal block 50, attached to housing 11 by suitable means such as the screws 52 (FIGS. 2 and 3). Terminal block 50 is electrically connected to two sensing switches 51 mounted on opposite sides of the main axis 18A (FIGS. 2 and 3). Each sensing switch 51 includes a depending sensing arm 53 which carries a sensing roller 54. The sensing rollers 54 are positioned for engagement by a switch actuation surface 55 on cam 40 whenever the cam is moved downwardly away from retainer 42. The switch sensing arms 53 actuate the switches 51 from one sensing condition to another whenever the cam 40 is moved an appreciable distance downwardly from retainer 42.

Cam 40 is concentrically aligned with the main axis 18A so that roller 32 rolls along the surface 47. Thus, the drive member 30 and the cam member 40 are both mounted on the same main axis 18A.

Although the main axis 18A coincides with the axis of drive shaft 18 and with the axis of the paddle sensing shaft 23, it should be apparent that as long as the drive member 30 and the driven cam member 40 are on the same axis and roller 32 rotates on cam surface 47, the driving and driven members can be displaced from the axes of the motor shaft or the paddle shaft. This could be accomplished with pulleys or gears, if desired.

For operation of level sensor 10, the apparatus is placed so that the paddle sensor 24 is at a given level in a container or other storage area. With motor 16 energized, and the sensor paddle 24 free to rotate, shaft 18 drives arm 31 rotatingly around the main axis 18A. The roller 32 rolls along the dwell portion 48 of cam surface 47 until it reaches the beginning of the lobe portion 49. Since the biasing force applied to cam 40 by spring 46 will not allow the cam member to be driven downwardly away from roller 32, cam 40 starts to rotate in the same direction as shaft 18. Thus, the roller 32 of the driving member 30 contacts lobe 49 on the cam surface 47 of the driven member 40 and transfers the driving force of the motor from shaft 18 to the paddle sensor shaft 23 and, accordingly, to paddle 24.

Whenever material fills the container up to the given sensing level, sensor paddle 24 is blocked. Paddle 24 and paddle shaft 23 cannot rotate; moreover, cam 40 is unable to rotate, being blocked from rotation by pin 45 in slot 44. Consequently, roller 32 rides up onto the lobe portion 49 of cam surface 47. Since the drive member 30 is rigidly attached to shaft 18, the drive member cannot move in a vertical direction. However, cam 40 is slidably attached to shaft 23, so that cam 40 is forced downward away from retainer 42; motor 16 is strong enough so that the downward force exerted through roller 32 overcomes the upward bias force of spring 46. As cam 40 moves down, the surfaces 55 on the cam engage the switch arm rollers 54 and drive the switch arms 53 outwardly from cam 40, actuating the two sensing switches 51.

The two sensing switches 51 can be used to control the input of material to the container in which level sensor 10 is mounted and cut off the material flow. The switches 51 are also used to control the energizing circuit of motor 16; when the switch arms 53 move out, the motor is de-energized. When the energizing circuit to the motor is opened, the drive shaft 18 stops turning and drive member 30 comes to rest with roller 32 located on some part of the lobe 49 of cam surface 47.

If the switch means 51 fails to operate and does not de-energize motor 16, so that drive shaft 18 continues to turn, roller 32 merely rides across the full extent of the lobe 49, past tip 49A and down the lobe back onto dwell portion 48. This action may continue for an indefinite period. Thus, the drive member 30 continues to rotate, and cam 40 moves alternately up and down as the lobe 49 on the cam surface 47 is engaged by roller 32. Consequently, even if the sensing switches 51 fail to de-energize motor 16, the motor cannot be damaged by being stalled while still energized.

Whenever the level of material falls below paddle 24, the paddle shaft 23 is again free to rotate. Since, in normal operation, motor 16 has been de-energized by one of the sensing switches 51, the motor is stopped. However, the cam lobe 49 is being forced against roller 32 by spring 46. Thus, the spring bias causes cam 40 to rotate, allowing roller 32 to move down the cam lobe slope. Thus, cam 40 rotates to again engage the dwell surface 48 of the cam with roller 32.

When this happens, the switch arms 53 again move toward cam 40, back to the positions shown in FIG. 1. This actuates the switch means 51 to restore the circuits connected to the switches to the original operating condition. Thus, the sensing switches 51 can be used to start the flow of material to the container again, and to energize motor 16, which in turn drives the paddle shaft 23 through the connection afforded by drive member 30 and the driven cam member 40. This continues until the container is again filled to the proper level and the whole cycle is repeated.

Figure 6:
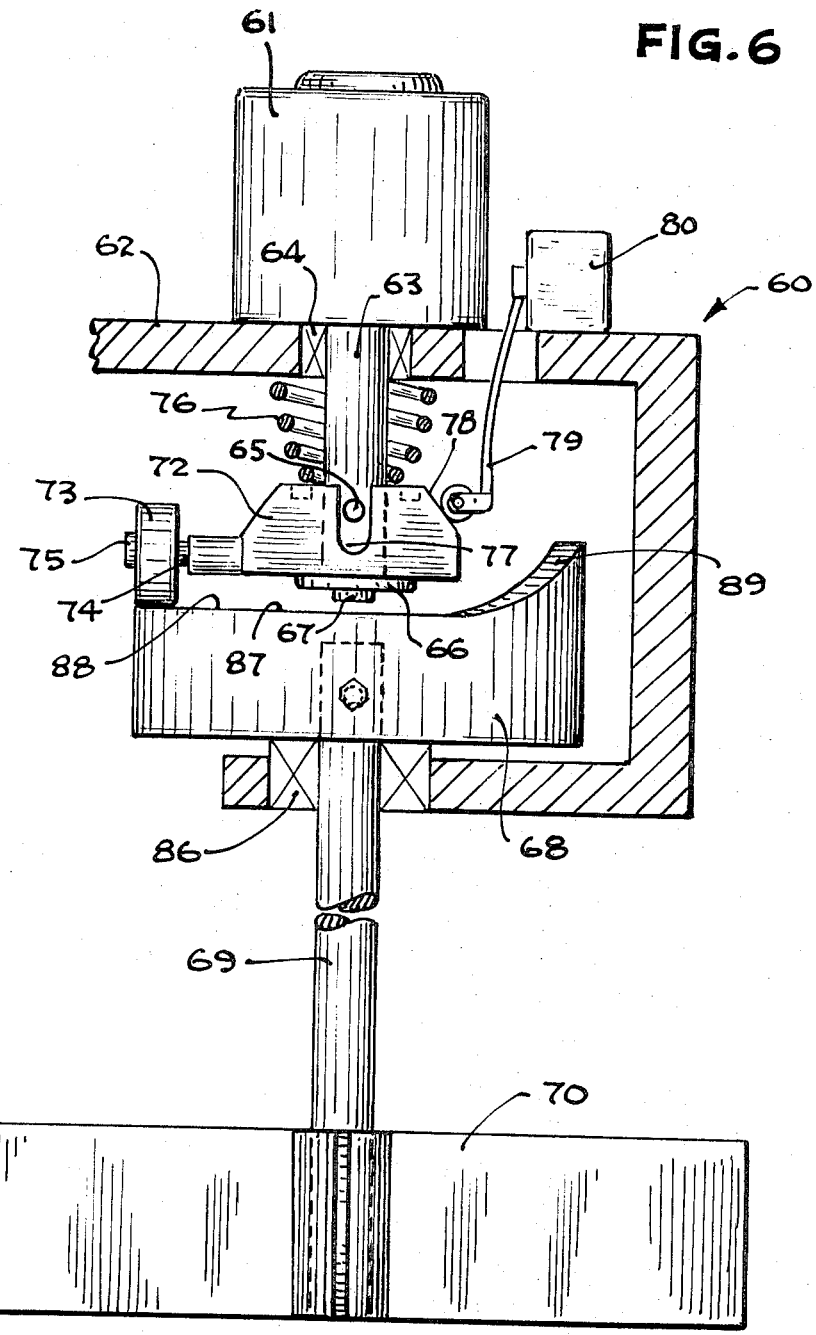
FIG. 6 is a schematic view of another embodiment of the present invention.

FIG. 6 shows a level sensor 60, comprising another embodiment of the present invention, in schematic form. Level sensor 60 includes a motor 61 attached to a support 62. The motor shaft 63 is rotatably mounted on housing 62 by means of a thrust bearing 64. The motor shaft carries a radial pin 65, a retainer 66, and a retainer bolt 67. A cam member 68 is firmly affixed to a paddle shaft 69 on which a paddle 70 is mounted. Paddle shaft 69 is mounted on support 62 by a thrust bearing 86. Cam 68 includes a cam surface 87 with a lobe portion 89 and a dwell portion 88.

A drive member 72 is slidably mounted on drive shaft 63; a roller 73 is mounted on a shaft 74 projecting radially from drive member 72 and held in place by a retainer 75. Drive member 72 is held against retainer 66 by bias means comprising a coil spring 76. Drive arm 72 includes a slot 77 in which the pin 65 is engaged, allowing the member 72 to move vertically, but not to rotate around the motor shaft 63. A switch contact surface 78 on drive member 72 is positioned to engage a switch arm 79 and actuate a switch 80 whenever member 72 moves upwardly through a substantial distance.

In level sensor 60, when rotation of paddle 70 is blocked, and roller 73 traverses the lobe 89 on cam surface 87, drive member 72 is moved upwardly against the bias of spring 76. This action actuates switch 80 by forcing switch arm 79 outwardly along surface 78.

In further embodiments of the invention it is possible to attach the cam to the motor shaft to serve as the drive member and to mount the roller on the paddle sensor shaft as the driven member. Also, with the roller mounted on the paddle shaft, it would be possible to use the bias means to have the roller move up and down as the paddle is blocked and unblocked, or to have the bias means engage the cam on the motor shaft so that the cams move up and down. Of course, many other modifications of the cam and drive roller geometry can be made without affecting the operation of the invention. Moreover, in further embodiments of the present invention, it might be desired to use more than one roller member or to use more than one lobe member. This is acceptable if, whenever the roller members are engaged with the lobe portions of the cam surface, the bias force urges the rotation of the members in the same direction.

We claim:

1. A level sensor for sensing accumulation of material, comprising:
   a drive member;
   driving means for driving the drive member rotatingly on a main axis;
   a driven member rotatable about the main axis, aligned with and engageable with said drive member;
   a sensing paddle connected to the driven member for rotation therewith;
   a first one of the drive and driven members including an annular cam surface with a dwell portion and a lobe portion;
   the second one of the drive and driven members including a roller aligned to roll along the cam surface of the first member;
   at least one of the drive and driven members being movable away from the other member;
   biasing means urging the drive member and the driven member into engagement with each other so that when the sensing paddle is free to rotate, the roller rolls against the lobe portion of the cam surface and causes the sensing paddle to rotate, and so that when the sensing paddle is blocked by accumulated material, the roller rides onto the lobe portion of the cam surface and causes the drive member and driven member to move away from each other; and
   sensing switch means actuated between one sensing condition and another whenever said first and second members move away from each other.

2. A level sensor according to claim 1 in which the drive member comprises a rotating drive shaft coaxial with the main axis and a radial drive arm mounted on one end of the drive shaft, with the roller mounted on the drive arm for rotation about a roller axis different from the main axis, and in which the driven member comprises a paddle shaft coaxially aligned with the drive shaft in close proximity thereto, the cam surface comprising an annular surface on a cam member mounted on the end of the paddle shaft adjacent the drive shaft.

3. A level sensor according to claim 2 in which the roller axis extends radially from the main axis, and the roller follows an annular orbital path around the main axis, the cam surface being of circular configuration concentric with the main axis.

4. A level sensor according to claim 2 in which the cam member is longitudinally movable along the main axis and in which the sensing means comprises a sensing switch having a sensing arm projecting into the path of movement of the cam member.

5. A level sensor according to claim 2 in which the drive arm is movable longitudinally of the main axis and in which the sensing switch means comprises a sensing switch projecting into the path of movement of the drive arm.

6. A level sensor according to claim 2 in which the dwell portion of the cam surface is of substantially constant height and the lobe portion includes two gradual sloped segments meeting at a sharply peaked tip, so that the roller cannot rest on the tip.

* * * * *